United States Patent [19]

Glaze et al.

[11] 4,270,409
[45] Jun. 2, 1981

[54] TORQUE TRANSFER MECHANISM

[76] Inventors: Jack G. Glaze, 1209 Roby, Stoughton, Wis. 53589; Robert B. Overbeek, 105 N. Pontiac, Janesville, Wis. 53545

[21] Appl. No.: 870,532

[22] Filed: Jan. 18, 1978

[51] Int. Cl.³ .................. F16H 37/06; B60K 17/34
[52] U.S. Cl. .................. 74/665 GA; 74/665 T; 74/358; 74/665 G; 180/247
[58] Field of Search ......... 74/665 G, 665 S, 665 T, 74/665 GA, 665 GB, 665 GC, 665 GD, 665 F, 356, 329, 710, 745, 358, 359; 180/44 R, 49, 51, 233, 247; 192/48.8, 48.91

[56] References Cited

U.S. PATENT DOCUMENTS

| | | | |
|---|---|---|---|
| 2,341,883 | 2/1944 | Sloan | 180/44 R |
| 2,362,925 | 11/1944 | Peterson et al. | 74/665 GD |
| 2,397,587 | 4/1946 | Armantrout | 74/665 GA |
| 2,475,803 | 7/1949 | Probst | 74/745 |
| 2,579,554 | 12/1951 | Davis | 74/665 T X |
| 2,674,136 | 4/1954 | Bryan | 180/49 |
| 2,774,249 | 12/1956 | Moline | 74/358 X |
| 3,129,600 | 4/1964 | Chung | 74/359 X |
| 3,788,164 | 1/1974 | Ojima | 74/665 T |
| 3,848,691 | 11/1974 | Dolan | 74/714 |
| 4,019,400 | 4/1977 | Stump | 74/333 |

FOREIGN PATENT DOCUMENTS 2281524  8/1975  France .................. 74/665 GA Primary Examiner—C. J. Husar
Assistant Examiner—Philip W. Thor
Attorney, Agent, or Firm—Robert M. Leonardi; Norb A. Heban

[57] ABSTRACT

A torque transfer mechanism is disclosed for incorporation in a four-wheel drive vehicle for establishing high and low speed power paths to front and rear drive axles. The torque transfer mechanism comprises an input shaft for receiving power from an engine and a pair of output shafts for delivering power to the drive axles. Constant mesh gearing is provided to operatively connect the input and output shafts in desired power paths. The gearing comprises an input gear set and an output gear set. Each gear set includes a plurality of gears provided with clutch means adapted to be selectively engaged by a pair of clutch collars. The clutch collars can be operated simultaneously in the same axial direction by a single shift fork to drive the front and rear axles in either the high or low speed power path.

6 Claims, 3 Drawing Figures

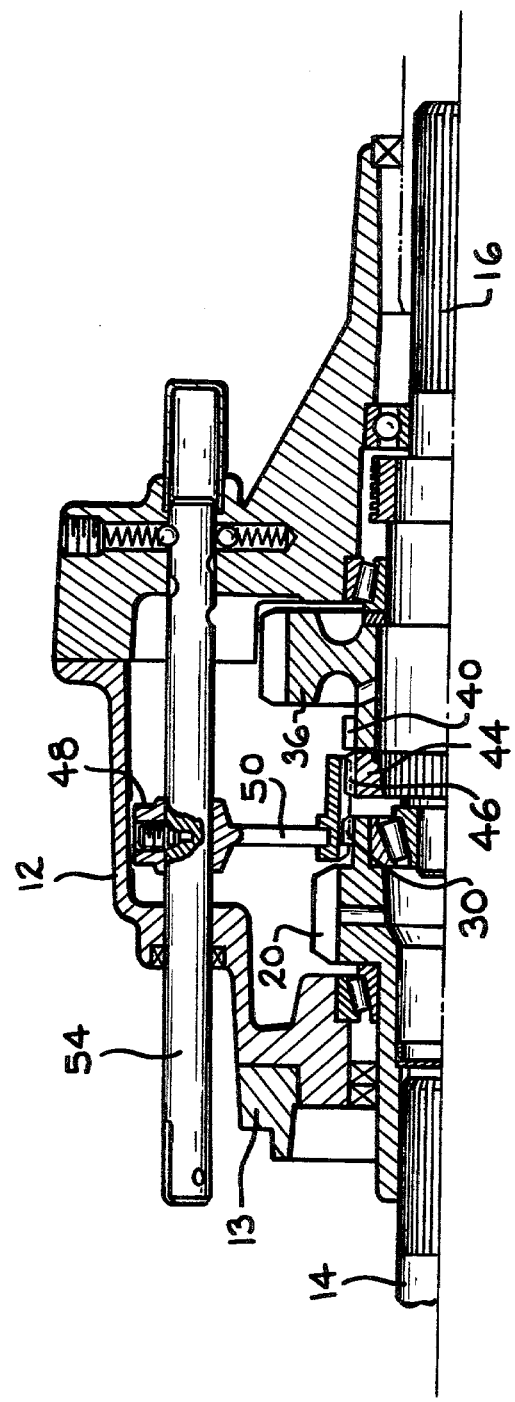

4,270,409

TORQUE TRANSFER MECHANISM

BACKGROUND OF THE INVENTION

This invention relates to a plural power path torque transfer mechanism and more particularly to a clutching arrangement for establishing the power paths.

It is well recognized in the art that the tractive efforts of a vehicle are substantially improved if driving torque is applied to both front and rear axles. This concept has long been used in military and off-highway vehicles designed to operate over unimproved terrain by providing a mechanism to transfer torque between the axles. Ordinarily the torque transfer mechanism is connected to a transmission which is driven in the conventional manner by a prime mover, and is adapted to split the torque between the front and rear axles.

In recent years much effort has been devoted to part-time torque transfer mechanisms, i.e., those having a plurality of power paths selectively engageable by a vehicle operator. Common part-time torque transfer mechanisms are designed with all constant mesh gearing and a pair of shiftable clutch collars for selecting the desired power path. In these devices it is advantageous to interconnect the clutch collars so that a single operating means may effect shifting of both collars to establish the power path selection.

However, certain problems may arise in connection with this type system. One problem is that the clutches provided on the various gears for cooperating with the clutch collars require excessive movement of the collars to complete the different shifting operations. This not only adds to the length of the unit but is also undesirable from a control standpoint because it required additional space to achieve the clutching operation.

SUMMARY OF THE INVENTION

It is therefore an object of the present invention to provide a compact torque transfer mechanism having constant mesh gearing, a plurality of power paths, and a pair of simultaneously shiftable clutch collars.

These and other objects of the present invention are achieved by a torque transfer mechanism having constant mesh gearing and an improved clutch arrangement for establishing high and low speed power paths through the gearing. The constant mesh gearing comprises an input gear set associated with an input shaft and an output gear set associated with at least one output shaft. The clutch arrangement includes a high speed shift collar and a low speed shift collar. The collars are simultaneously operable in the same axial direction by means of a single shift fork. In a preferred embodiment suitable control means may be connected to the shift fork to slide the shift collars axially between a two-wheel drive high, a four-wheel drive high, a neutral and a four-wheel drive low position.

BRIEF DESCRIPTION OF THE DRAWINGS

FIG. 3 is a partial sectional view taken along line 3—3 of FIG. 1.

DETAILED DESCRIPTION OF THE PREFERRED EMBODIMENT

Figure 2:
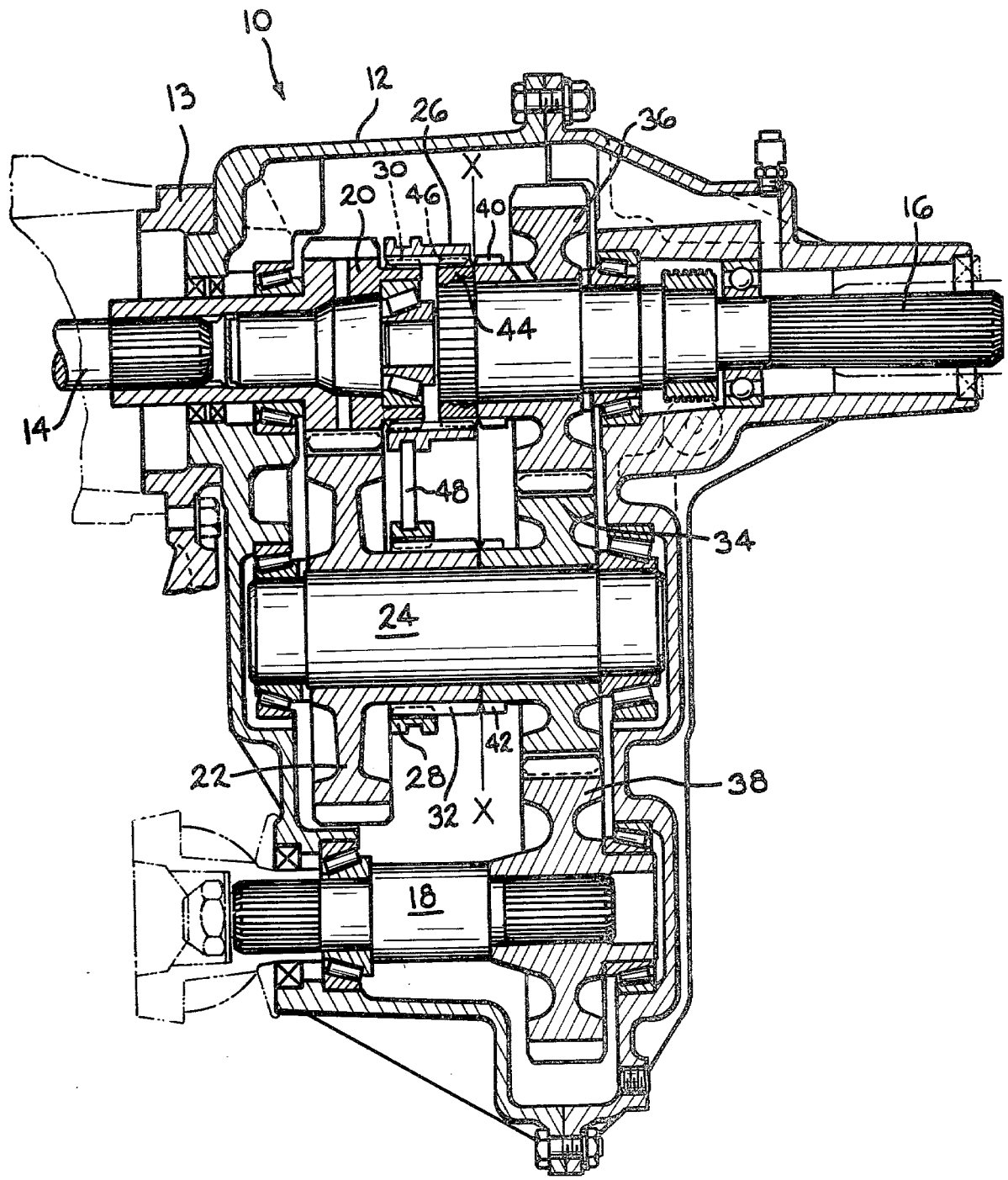
FIG. 2 is a sectional view taken along line 2—2 of FIG. 1.

Referring to the drawings, and particularly to the structure illustrated in FIG. 2, a torque transfer mechanism shown generally at 10, comprises a housing 12. The mechanism 10 is adapted to transmit driving force from a change-speed gear box (not shown) to front and rear driving axles (not shown) of a four-wheel drive vehicle. Constant mesh gearing is provided in housing 12 for establishing a plurality of power paths through the torque transfer mechanism 10. The constant mesh gearing consists of an input gear set adapted to be driven by an input shaft 14 which is drivingly connected to the output of change-speed gear box and an output gear set adapted for connection to a first output shaft 16 and a second output shaft 18. First output shaft 16 is drivably connected in a conventional manner to a rearwardly extending propeller shaft (not shown) for delivering power to the rear axle assembly. Second output shaft 18 is connected in a conventional manner to a forwardly extending propeller shaft (not shown) for delivering power to the front axle assembly.

More specifically, the constant mesh gearing of the input gear set is located in the forward portion of the housing 12 and includes a drive gear 20 splined to the input shaft 14 and a driven gear 22 rotatably supported on the forward end of an intermediate shaft 24 which is mounted for rotation in the housing 12. Clutch means are provided on drive and driven gears 20 and 22 for cooperating with a pair of shiftable clutch collars 26 and 28, respectively. The clutch means on drive gear 20 comprises an annular row of external clutch teeth 30 integrally formed on an inwardly extending hub portion of the drive gear 20. The clutch means on the driven gear 22 comprises an annular row of external clutch teeth 32 integrally formed on an inwardly extending hub portion of the driven gear 22.

The constant mesh gearing of the output gear set is located in the rearward portion of housing 12 and includes an intermediate gear 34 rotatably supported on the rearward end of the intermediate shaft 24, a first output gear 36 and a second output gear 38. First and second output gears 36 and 38 as is well known in the art, are identical in diameter and number of teeth so that power to each output shaft 16 and 18 is the same. Intermediate gear 34 serves as a means to split drive from the input shaft 14 to both first and second output shafts 16 and 18. To accomplish the drive connection to the first output shaft 16 the first output gear 36 is provided with clutch means for cooperating with the shiftable clutch collar 26. The clutch means of the first output gear 36 comprises an annular row of external clutch teeth 40, similar to clutch teeth 30 on drive gear 20, which is constructed on an inwardly extending axial hub portion integral with the first output gear 36.

In the preferred embodiment, the drive connection to the second output shaft 18 is provided by splining the second output gear 38 directly to the rearward end of the output shaft 18. However, if desired, gear 38 can be rotatably supported on the output shaft 18 and a suitable manual clutch disconnect can be provided on the gear 38 and output shaft 18 for selectively engaging and disengaging the gear 38 therefrom.

The low speed power path through the gearing is established by interconnecting the driven gear 22 to intermediate 34 through clutch means on an inwardly extending hub portion on the gear 34 which cooperates with the clutch collar 28. The clutch means comprises an annular row of external clutch teeth 42 on the hub portion which is similar to the row of clutch teeth 32.

It can be seen in FIG. 2 that the rear output shaft 16 has its inner end piloted in the drive gear 20 in a well known manner. Adjacent the piloted end portion, the first output shaft 16 has an enlarged diameter ring portion 44 adapted to be positioned between the drive gear clutch teeth 30 and the first output gear clutch teeth 40. Clutch means is constructed on the ring portion 44 for cooperating with the shiftable clutch collar 26. The clutch means comprises an annular row of external clutch teeth 46 similar to clutch teeth 30 and 40.

In the preferred embodiment, clutch collar 26 is in constant engagement with first output shaft clutch teeth 46 and clutch collar 28 is in constant engagement with driven gear clutch teeth 32 while being axially slideable relative thereto.

The arrangement described thus far is adapted to provide a first clutch means for establishing the high speed power path and a second clutch means for establishing the low speed power path. Drive gear clutch teeth 30 first output shaft clutch teeth 46, first output gear clutch teeth 40 and clutch collar 26 constitute the first clutch means. Driven gear clutch teeth 32, intermediate gear clutch teeth 42 and clutch collar 28 constitute the second clutch means.

Figure 1:
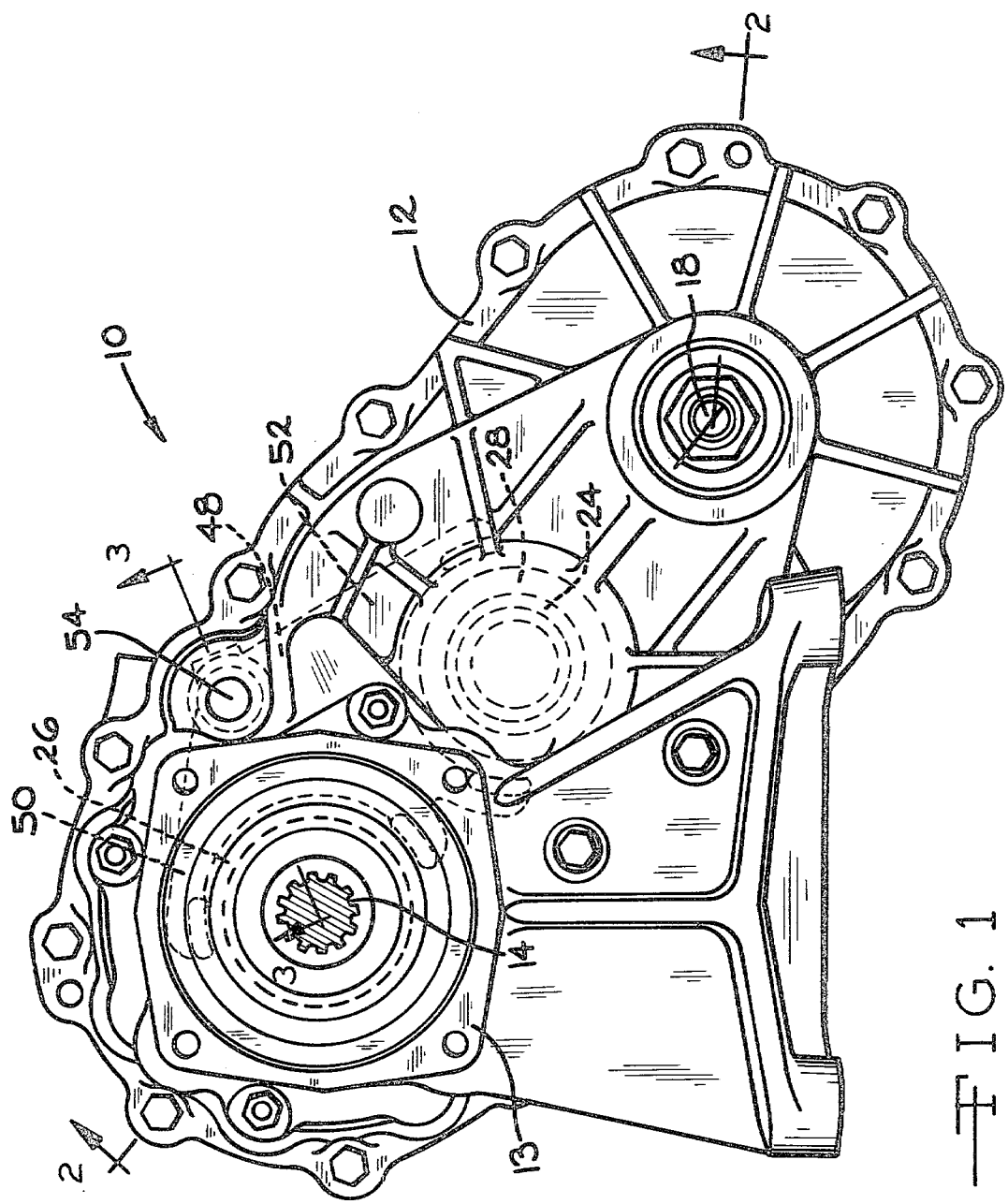
FIG. 1 is an end elevational view of a torque transfer mechanism constructed in accordance with the present invention.

Operating means is provided to interconnect the clutch collars 26 and 28 so that both are shifted simultaneously in the same axial direction. The operating means, as best seen in FIG. 1, comprises a single fork 48 having a pair of integral yoke portions 50 and 52. Yoke portion 50 is adapted to engage a suitable annular groove in clutch collar 26 and yoke portion 52 is adapted to engage a similar groove in clutch collar 28. The fork 48 has four operative positions: (1) a two-wheel drive high; (2) a four-wheel drive high; (3) a neutral; and (4) a four-wheel drive low.

As best seen in FIG. 3, the shift fork 48 is secured to a shift rod 54 which is slidably positioned in the upper portion of the housing 12. The shift rod 54 can be vacuum, cable or linkage controlled in any well known manner with suitable detents provided for cooperating with and thereby maintaining the same in one of the four operative positions.

Clutch collar 28 and associated clutch teeth 32 on driven gear 22 are constructed and arranged to permit the clutch collar 28 to be inactive in the first three operative positions and to couple the driven gear 22 and intermediate gear 34 in the fourth position to establish a reduction gear set. The reduction gear set comprises drive gear 20, driven gear 22 and intermediate gear 34.

To achieve the desired operation in the first three operative positions, the axial length of clutch collar 26 and the axial length of the driven gear clutch teeth 32 are substantially equal. Also, the axial length of clutch collar 28 and the axial length of drive gear clutch teeth 30 are substantially equal. Referring specifically to FIG. 2 it will be seen that the mating end portions of output shaft ring portion 44 and first output gear 36 and the hub portions on driven gear 22 and intermediate gear 34 lie in the same vertical plane X-X. Thus the inner end portions of output shaft clutch teeth 46 and driven gear clutch teeth 32 are radially aligned as are inner end portions of first output gear clutch teeth 40 and intermediate gear clutch teeth 42. FIG. 2 illustrates the extreme forward position for both clutch collars 26 and 28. In this position the clutch collar 26 completely overlies drive gear clutch teeth 30 and first output shaft clutch teeth 46. Clutch collar 28 is disposed to the extreme left (as viewed in FIG. 2) of driven gear clutch teeth 32 and is radially aligned with the drive gear clutch teeth 30.

It will be seen that by controlling the axial lengths of the clutch collars 26 and 28 and by aligning drive gear clutch teeth 30 and first output shaft clutch teeth 46 with driven gear clutch teeth 32 and first output gear clutch teeth 40 with intermediate gear clutch teeth 42, the fork 48 can be operated to permit simultaneous movement of both the clutch collars 26 and 28 in the same axial direction to establish the desired power paths through the input and output gear sets of the torque transfer mechanism 10.

The operation of the present invention will be described briefly. In FIG. 2 clutch collar 26 is engaged with drive gear clutch teeth 30 and first output shaft clutch teeth 46 so that power from the input shaft 14 flows directly to the first output shaft 16 and to the rear axle in the two-wheel drive high speed power path. In this position the driven gear 22 is rotating but inactive or in a non-driving position while all other gears are stationary.

To establish the next power path (four-wheel drive high), shift rod 54 moves the fork 48 to its next axial position, thereby moving both shift collars 26 and 28 rearward or to the right one position. As a result, the rear portion of shift collar 26 is partially engaged with drive gear clutch teeth 30, the intermediate portion is wholly engaged with first output shaft clutch teeth 46 and the forward portion is partially engaged with first output gear clutch teeth 40. In this position power flows from the input shaft 14 directly to first output shaft 16 and the rear axle. Further, since second output gear 36 is now engaged by collar 26, power also flows across intermediate gear 34 to second output gear 38, thereby driving second output shaft 18 and the front axle. Driven gear 22 rotates during this phase of operation but remains in an inactive or non-driving position.

Actuating the shift rod 54 to its next axial position moves the fork 48 and shifts both clutch collars 26 and 28 rearward to their next position (neutral). The rear portion of clutch collar 26 is now completely out of engagement with drive gear clutch teeth 30 and clutch collar 28 is located at the extreme rearward or right end of driven gear clutch teeth 32. Driven gear 22 rotates but remains in an inactive or non-driving position. All other gears are stationary at this point of operation.

The final power path (four-wheel drive low) is established when the shift rod 54 moves the fork 48 to its extreme rightward position. This causes both clutch collars 26 and 28 to shift axially to their rearwardmost position where clutch collar 26 engages first output shaft clutch teeth 46 and first output gear clutch teeth 40 and, simultaneously, clutch collar 28 engages intermediate gear clutch teeth 42. Thus, power can be delivered from input shaft 14 to drive gear 20, driven gear 22, and to intermediate gear 34 where the power path is split between the first output gear 36 (and to first output shaft 16) and the second output gear 38 (and to second output shaft 18).

From the foregoing, it will be seen that clutch collar 28 is capable of sliding along driven gear clutch teeth 32 through three inactive positions while clutch collar 26 is sliding between drive gear clutch teeth 30 and first output gear clutch teeth 40.

Although the second output shaft 18 has been shown as a solid axle with the driven gear 38 splined directly thereto, it will be obvious that other well known arrangements can be substituted. For example, a manual disconnect can be applied to selectively connect and disconnect the gear from the output shaft as previously mentioned. In addition, an automatic clutch can be incorporated on the second output shaft to engage in only the four-wheel drive mode when the output shaft overruns the front propeller shaft.

In the preferred embodiment the torque transfer mechanism has been shown adapted for use in a four-wheel drive application. However, it will be apparent that the gearing and clutching arrangement disclosed can be applied to a two-speed gear box for establishing direct and underdrive conditions therethrough without modification. This would merely require the elimination of the second output gear 38 and associate output shaft 18.

The present invention, therefore, provides a multiple power path drive system which allows an operator to select a plurality of power paths in a simple manner by means of a compact clutching arrangement.

While various features of this invention have been shown and described, it should be obvious to one skilled in the art that other modifications may be made therein without departing from the scope of the invention as defined in the following claims.

We claim:

1. A torque transfer mechanism having a high speed power path and a low speed power path, said mechanism comprising:
   a rotatable input shaft;
   a first rotatable output shaft coaxial with said input shaft;
   an intermediate shaft radially spaced from said input shaft;
   an input gear set including a drive gear connected to said input shaft and a driven gear supported for rotation on said intermediate shaft and in constant meshing engagement with said drive gear;
   an output gear set including a first output gear supported for rotation on said first output shaft and an intermediate gear supported for rotation on said intermediate shaft and in constant meshing engagement with said first output gear;
   first clutch means for establishing the high speed power path including clutch teeth on said drive gear, clutch teeth on said first output shaft and clutch teeth on said first output gear, and a first axially shiftable clutch collar in constant engagement with said first output shaft clutch teeth and slidably engageable with said drive gear clutch teeth and said first output gear clutch teeth;
   second clutch means for establishing the low speed power path including clutch teeth on said drive gear and clutch teeth on said intermediate gear, and a second axially shiftable clutch collar in constant engagement with said driven gear clutch teeth and slidably engageable with said intermediate gear clutch teeth;
   operating means connected to said first and second shiftable clutch collars for shifting said clutch collars simultaneoulsy in the same axial direction;
   said driven gear clutch teeth having an end portion adjacent said intermediate gear substantially radially aligned with an end portion of said output shaft clutch teeth adjacent said first output gear;
   an end portion of said output gear clutch teeth adjacent said output shaft clutch teeth substantially radially aligned with an end portion of said intermediate gear clutch teeth adjacent said driven gear;
   said first and second clutch collars having a first position wherein said first clutch collar is engaged with said drive gear clutch teeth for establishing the high speed power path between said input shaft and said first output shaft and wherein said second clutch collar is disengaged with said intermediate gear clutch teeth;
   said first and second clutch collars having a second position wherein said first clutch collar is engaged with said first output gear clutch teeth and said second clutch collar is disengaged with said intermediate gear clutch teeth; and
   said first and said second clutch collars having a third position wherein said first clutch collar is engaged with said first output gear clutch teeth and said second clutch collar is engaged with said intermediate gear clutch teeth for establishing the low speed power path between said input shaft and said first output shaft.

2. A torque transfer mechanism according to claim 1 wherein said operating means includes a single shift fork having a pair of integral yokes, one of said yokes engaging said first clutch collar and the other of said yokes engaging said second clutch collar.

3. A torque transfer mechanism according to claim 1 wherein a second output shaft is spaced from said input shaft, said output gear set further includes a second output gear mounted on said second output shaft and in constant meshing engagement with said intermediate gear, said first and second clutch collars having a fourth position wherein said first clutch collar is engaged with said drive gear clutch teeth and said first output gear clutch teeth for establishing the high speed power path between said input shaft and first and second output shaft and said second clutch collar is disengaged from said intermediate gear.

4. A torque transfer mechanism according to claim 1 wherein said first and second clutch collars have an axial length, said axial length of said first clutch collar is substantially greater than said axial length of said second clutch collar.

5. A torque transfer mechanism according to claim 4 wherein said drive gear clutch teeth and said driven gear clutch teeth have an axial length, said drive gear clutch teeth axial length being substantially equal to said second clutch collar axial length and said driven gear clutch teeth being substantially equal to said first clutch collar axial length.

6. A torque transfer mechanism according to claim 5 wherein said first output shaft clutch teeth have an axial length, said axial length of said first clutch collar being constructed so that substantially equal to the combined axial lengths of said drive gear clutch teeth and first output shaft clutch teeth.

* * * * *